May 13, 1969

G. BERGSON

3,444,379

ELIMINATION OF DARK CURRENT EFFECTS IN PHOTOMULTIPLIER TUBES

Filed May 31, 1966

INVENTOR
GUSTAV BERGSON

United States Patent Office 3,444,379
Patented May 13, 1969

3,444,379
ELIMINATION OF DARK CURRENT EFFECTS
IN PHOTOMULTIPLIER TUBES
Gustav Bergson, Jenkintown, Pa. (Cedarbrook Hill
Apts. II, Apt. B-117, Wyncote, Pa. 19095)
Filed May 31, 1966, Ser. No. 554,194
Int. Cl. H01j 39/12
U.S. Cl. 250—207
1 Claim

ABSTRACT OF THE DISCLOSURE

The ability of a photomultiplier tube to register low light levels is limited by the dark current through the tube and load resistor. The dark current is that current which flows in the absence of any light upon the tube. By connecting a high value resistor in series with a variable voltage of opposite polarity across the load resistor and adjusting the variable voltage until the voltage drop across the load resistor is virtually zero, a low level light reading is obtained.

---

The use of phototubes as detectors of radiation has, in the past, been limited as to their ultimate sensitivity by what is known as their dark current. This signifies the current which passes under conditions wherein the applied radiation is essentially zero.

With respect to phototubes of the photomultiplier type, some help in this direction has prevailed by the availability, from the manufacturer, of tubes of a particular type which were selected for the low value of their dark current. Thus, in the case of the type 931A tube, a selected tube of this type is given the designation type 1P21 and this is available at a price somewhat more than ten times that of the unselected type. In practice it is found that the amount of improvement that prevails, even after one has paid the premium price, is disappointing.

In equipment using such tubes it is found that on a most sensitive scale having a full scale current of $10^{-9}$ amperes, a dark current of less than 15% of full scale is obtained only with careful choice of tube. Such procedure has proved both expensive and time consuming.

It is the purpose of this invention to insert a means whereby the dark current limitation is essentially eliminated so that the partial success of only a portion of the more expensive tubes is replaced by almost complete success using the less expensive tubes and the time factor is essentially eliminated as an added bonus.

Figure 1:
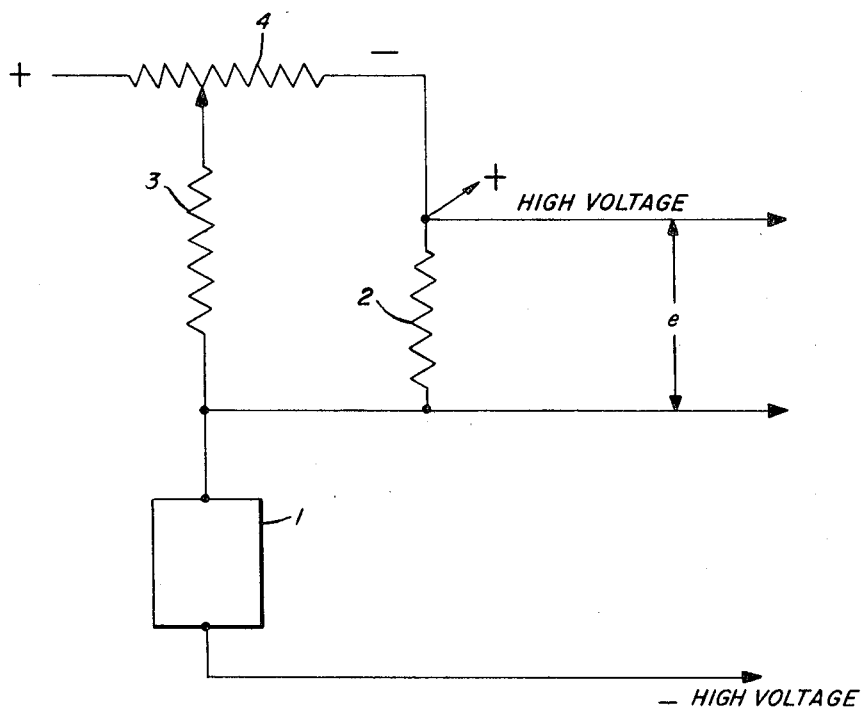

In practice the photomultiplier cited above, 1 in FIG. 1, has been operated with the load resistor 2 in FIG. 1 switched for calibrated range changes from a value of 50 kilohms to a value of 500 megohms under which circumstances the current at full scale changed from $10^{-5}$ amperes to $10^{-9}$ amperes. It has been customary to select photomultiplier tubes so that the dark current did not exceed 15% of that required for full scale in the most sensitive position, that is, with the load resistor 2 equal to 500 megohms. With the present invention one can assume that dark currents less than 50% of that required for full scale in this same position, or less than $5 \times 10^{-10}$ amperes, will be acceptable. For this condition the effective resistance of the photomultiplier 1 as seen from the load resistor 2 is greater than $10^{11}$ megohms.

In the present invention a variable source of voltage is presented at the arm of the potentiometer 4 in FIG. 1 to supply current to the resistor 3 of FIG. 1. The resistor 3 has a resistance which is high with respect to that of the load resistor 2 of FIG. 1 in the most sensitive position, that is, with respect to 500 megohms in the present example, and it is selected as 20,000 megohms. Under these circumstances, and recalling that the load resistor 2 in the most sensitive position is small in resistance compared to the effective resistance of the phototube, the current through the resistor 3 is determined by the adjustment of the arm of the potentiometer 4, as noted above, and by the fixed values of the resistors 3 and 2, and is essentially unaffected by the effective resistance of the photomultiplier over the range of light covered by the load resistor value. In particular, the current through the resistors 3 and 2 can be adjusted to be equal and opposite to that due to the dark current through the load resistor 2 thereby cancelling that current so that under conditions of zero illumination of the photomultiplier the voltage across the load resistor in the most sensitive position is essentially zero.

As noted above, measurement of light over a wide range can make it desirable to change the value of the load resistor 2 and this is customarily done by switching this resistor value to lower values whereby higher light levels are measured. As noted the resistor 3 is 40 times the value of the load resistor 2 and the full scale light level would be multiplied by three if resistor 2 is decreased by a factor of three. This would cause a change in the current through resistor 3 of $\tfrac{2}{3} \times \tfrac{1}{40}$ or $\tfrac{1}{60}$ of its original value.

Where it had been custom to select photomultipliers whose dark currents were less than 15% of the full scale value on the most sensitive range this acceptance value is now increased to 50% and when the cancellation current through resistor 3 for this poorest condition is considered in the above mentioned change to three times in light range, the change in cancellation current is $\tfrac{1}{60} \times \tfrac{1}{2} \times \tfrac{1}{3}$ of the photomultiplier current for full scale on this range, that is $\tfrac{1}{360}$ of full scale or approximately $\tfrac{1}{4}\%$ which can be tolerated.

Switching the load resistor 2 to still lower values, corresponding to higher levels of light measurement can be shown to cause increasingly lower errors. Less severe dark currents will cause lower errors also. Thus, we have a means of greatly improving the acceptability of phototubes, thereby decreasing their cost in equipment while, when account is taken of the limitation which this dark current has placed on the useful range of this device, a means for extending this range is presented.

Figure 2:
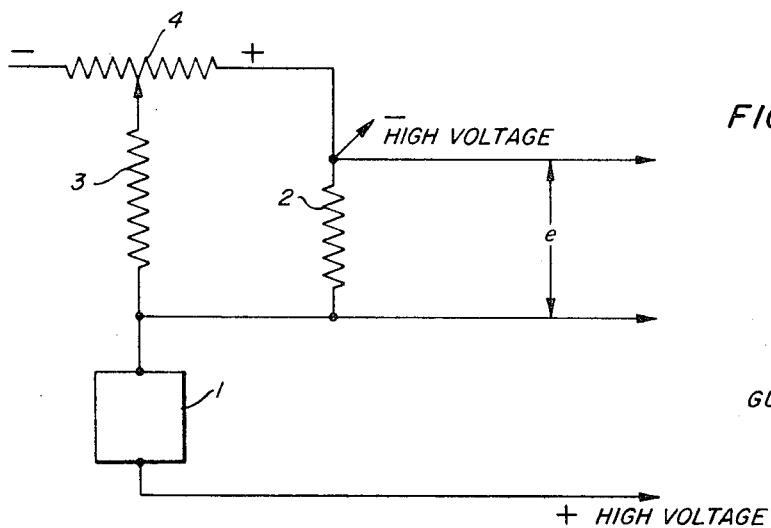

The above discussion is directed at FIG. 1 wherein the anode of the photomultiplier is at the junction of resistors 1 and 2 and the cathode is connected to the negative of the high voltage. Under some conditions photomultipliers are operated with the anode connected to positive of the high voltage and the load connected to the cathode. Utilization of the present invention under these conditions is obtained, as shown in FIG. 2 wherein the high and low voltage connections are interchanged and the positive and negative connections of the supply for variable resistor 4 are interchanged. The connection to the junction of $2^1$ and $3^1$ is now the cathode and the connection to the positive high voltage is the anode.

Although the explanation has centered on the photomultiplier, when account is taken of the generally higher effective resistances of other phototubes, it is seen that the invention can be applied to them.

What is claimed is:

1. A voltage operated light-sensitive device whose current varies in the same sense as the incident light and including a load resistor between whose terminals a much smaller voltage than said first mentioned voltage is measured as a measure of said current, a second resistor having a resistance value much higher than that of said load resistor, said second resistor being connected to an adjustable voltage source one terminal of which is connected to the junction of said first mentioned voltage source and said load resistor while said second resistor is connected to the other terminal of said load resistor at its junction to said light sensitive device, the polarity of said adjustable voltage source being such as to permit its adjustment to pass a current through said second resistor and said load resistor wherein the net current through said load resistor can be made essentially zero under conditions of no incident light on said light-sensitive device.

References Cited

UNITED STATES PATENTS

| | | | |
|---|---|---|---|
| 2,012,573 | 8/1935 | Long | 250—206 |
| 2,913,585 | 11/1959 | Rodman | 250—207 |
| 3,209,153 | 9/1965 | Frank | 250—207 |
| 3,296,445 | 1/1967 | Roos et al. | 250—207 |
| 3,351,764 | 11/1967 | Blackmer | 250—207 |
| 3,358,145 | 12/1967 | Cashion et al. | 250—207 |
| 3,222,980 | 12/1965 | Kalmus | 250—207 |

JAMES W. LAWRENCE, *Primary Examiner.*

C. R. CAMPBELL, *Assistant Examiner.*

U.S. Cl. X.R.

250—206, 214